(12) United States Patent
Hagiya

(10) Patent No.: US 9,770,796 B2
(45) Date of Patent: Sep. 26, 2017

(54) METHODS OF USING A 4-WAY COMPRESSION GROOVED COUPLING

(71) Applicant: Maxfit Technology Co., Ltd., Belize (BZ)

(72) Inventor: Howard Hagiya, Ibaragi (JP)

(73) Assignee: Maxfit Technology Co., Ltd., Kaosiung (TW)

( * ) Notice: Subject to any disclaimer, the term of this patent is extended or adjusted under 35 U.S.C. 154(b) by 101 days.

(21) Appl. No.: 14/101,926

(22) Filed: Dec. 10, 2013

(65) Prior Publication Data

US 2014/0096361 A1  Apr. 10, 2014

Related U.S. Application Data

(62) Division of application No. 12/955,891, filed on Nov. 29, 2010, now Pat. No. 8,621,741.

(60) Provisional application No. 61/265,327, filed on Nov. 30, 2009.

(51) Int. Cl.

| *B23P 11/00* | (2006.01) |
|---|---|
| *B23P 19/02* | (2006.01) |
| *F16L 23/08* | (2006.01) |
| *F16L 17/04* | (2006.01) |

(52) U.S. Cl.
CPC ............. *B23P 19/022* (2013.01); *F16L 17/04* (2013.01); *F16L 23/08* (2013.01); *Y10T 29/49826* (2015.01); *Y10T 29/49863* (2015.01); *Y10T 29/49908* (2015.01); *Y10T 29/49925* (2015.01); *Y10T 29/49927* (2015.01)

(58) Field of Classification Search
CPC ....... B21D 41/00; B21D 15/06; F16L 17/025; F16L 21/022; F16L 25/12; F16L 17/04
See application file for complete search history.

(56) References Cited

U.S. PATENT DOCUMENTS

| 7,950,701 B2* | 5/2011 | Dole ................. F16L 17/04 285/253 |
|---|---|---|
| 8,621,741 B2* | 1/2014 | Hagiya ............. B23P 19/022 29/428 |
| 2005/0253029 A1* | 11/2005 | Gibb ................. F16L 17/04 248/158 |

* cited by examiner

*Primary Examiner* — Minh Trinh
(74) *Attorney, Agent, or Firm* — Patrick M Dwyer

(57) ABSTRACT

A method for joining and sealing two grooved-ended pipe segments without disassembling a coupling is disclosed. The coupling has a housing with upper and lower arcuate housing segments and left and right bridge segments. Each bridge segment has at least one set of dihedrally angled faces that engage corresponding faces each in the upper and lower housing segments. Drawing the upper and lower segments inwardly together along a first axis, presses each bridge segment inward along a second axis roughly tangential to the first axis. All segments are loosely pre-assembled into a coupling which has a one-piece circular sealing gasket that has an inward circumferential and centrally positioned pipe stop that has an inner diameter smaller than an outer diameter of the pipes to be joined.

9 Claims, 8 Drawing Sheets

METHODS OF USING A 4-WAY COMPRESSION GROOVED COUPLING

CROSS-REFERENCE TO RELATED APPLICATIONS

This is a divisional of pending U.S. non-provisional patent application Ser. No. 12/955,891, filed Nov. 29, 2010, and also claims priority to U.S. provisional patent application Ser. No. 61/265,327, filed Nov. 30, 2009, the entirety of which applications are incorporated by reference herein.

FIELD

The invention relates to pipe joints; more particularly, it relates to housing type pipe couplings for creating a sealed connection between coaxial groove ended pipes.

BACKGROUND

Housing type pipe couplings are widely used for axially joining two pipes together in such a way as to create a non-leaking union between the pipe ends. To prevent leakage, it is often desirable to prevent longitudinal, angular or rotational movement of the pipe ends within the coupling. This type of coupling is called a rigid coupling Generally, the coupling is formed of arcuate housing segments which are fastened around the pipe ends to form a generally ring-like coupling housing. Typically, two segments are used, a pair of arcuate or generally semicircular housing halves, which are fastened together, often bolted together. Housing halves are substantially U- or C-shaped in longitudinal (axial) cross section to provide room for gasket pieces. In some models, the inwardly projecting peripheral edges of the housing halves, also referred to as shoulders, are shaped with keys or lands for interlocking within circumferential grooves now commonly provided in the pipe ends.

The coupling is secured as bolts are tightened through bolt holes until the key segments engage the circumferential grooves on the pipe ends, thus fastening the pipes together. Where the two housing halves meet around the circumference of the pipes, a mating structure is often used to lock one housing half to the other and to add stability. A rubber gasket, also frequently U-shaped or C-shaped in longitudinal (axial) cross-section, is typically arranged within the coupling in a gasket pocket formed by the U-shaped longitudinal cross section of the coupling housing, such that when the housing halves are tightened against the pipe ends the inner peripheral edges of the gasket are sealed against the pipe end portions.

Pipe ends are typically grooved using either a rolled or cut groove. A roll groove uses a rolling machine to displace the pipe walls forming a curved-edged groove containing a top corner and a bottom corner with the top corner to corner separation longer than the bottom corner to corner separation. The gasket sealing surface is the distance between the outer groove wall and the end of the pipe. A cut groove removes pipe material to form a groove with straight walls perpendicular to the longitudinal axis of the pipe and therefore has no rounded corners.

Whether rolled or cut, the groove manufacturing method must accommodate significant tolerances set by the AWWA C-606 for gasket sealing surface, groove width, groove diameter, and outer diameter. Any pipe coupling must also accommodate such dimensional variations.

Several designs are in use which attempt to minimize longitudinal, angular or rotational movement of the pipe ends within the coupling. Angled self-adjusting couplings and tongue and groove style rigid couplings have slightly oval variable internal circumferential diameters that shrink when a coupling is tightened until it grips the pipe ends eliminating angular movement caused by variable outer diameters and groove depths. However, as key width is smaller than groove width to facilitate easy installation within tolerances, space between the key and corresponding groove allows for some longitudinal movement when pipes are exposed to pressure thrusts or thermal movement. Through these designs, longitudinal movement is effectively reduced, but never completely eliminated.

It is believed that conventional or known 'pre-assembled' coupling designs have not taken hold in the industry because they appear to require complex in situ assembly. For many years, in situ assembly and installation of such couplings has been the rule because no better alternative appeared to be practical, and manufacturers were offering single piece round gaskets that purportedly stretched to fit the pipe at hand, or else were using multi-part gasket pieces. For instance one known pre-assembled coupling, using a single piece gasket, has advertised that assembly would be simple and easy, even in hard to reach places, because the gasket would purportedly stretch to accommodate the inserted pipe until it could be locked in and sealed by tightening the coupling's bolts. However, market research suggests that this design has not acquired a large following, and laboratory tests have shown what is believed to be an unacceptable seal failure rate, due either to incomplete or inconsistent assembly efforts on site, or to actual tears or cuts in the gasket itself believed to have been caused by the very difficult pipe insertion conditions, often requiring wild gyrations of the pipe and or the gasket to get them to come together at all.

Other conventional couplings are multi-part disassembled pipe coupling components that must be assembled on site, and in situ, typically overhead and in hard to reach places. These couplings use some kind of separate member either inside the upper and lower housing halves, or intermediate to the upper and lower housing halves, and typically integral with some kind of sealing material, in a reported attempt to apply some kind of four-way pressure to the pipe sealing material. Typically these separate members are fitted in grooves or channels provided in upper and lower arcuate housing halves. None of these previously disclosed couplings appear to be in current use, and there is reason to believe that none of them was ever effective at rigidly joining and sealing two pipe segments together. It is also believed that none of them actually deliver real four-way compression either very well, or very consistently.

None of these couplings use a one-piece sealing gasket, and none of them can be installed onto respective pipe ends without first being disassembled. Also none of the couplings have slidably engaging dihedral angular faces where bridge segments engage corresponding upper and lower housing segment faces, such that all four segments move towards the center of the coupling as the bolts and nuts are tightened.

Housing type mechanical couplings on grooved-end pipes usually have two housing segments, some kind of rubber gasket and two pairs of bolts and nuts as shown in FIG. 1. When a coupling is installed on a pipe, it must be done in components, or a preassembled coupling unit must be broken down into those components. Then, if the sealing gasket is conventional one-piece gasket having an inner diameter smaller than the pipe it is designed to fit (see FIG. 2), it must be stretched and mounted it onto the pipe ends. Finally the two housing halves are placed on the gasket, bolts and nuts inserted, and the nuts fastened tight.

When a large number of such couplings are to be installed, higher work efficiency is required to shorten work time and to reduce installation costs. So assembly on site and gasket stretching, both time consuming and sometimes very difficult depending on conditions and location of joint, are inefficient and can become quite expensive.

What is needed, in order to raise efficiency of installation work, is a new type coupling to solve those technical problems, while at the same time still effectively eliminating longitudinal, angular and rotational movement of the pipe ends within the coupling housing.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A housing type mechanical coupling is disclosed. The coupling is installed onto respective pipe ends without first being disassembled. Such a coupling supplied direct from the factory in a pre-assembled configuration, all parts in place for installation, with only the nuts loose and ready for tightening, while still providing sufficient compression on the gasket to secure a leak-tight joint.

The rubber gasket used for the disclosed coupling preferably has an inner diameter (ID) B slightly larger than the pipe outer diameter (OD) and also has an inwardly protruding elastomeric ridge or pipe stop in the center as shown in FIG. 3. Each respective pipe end thus abuts this protrusion and stops there when it is inserted with a preselected advantageous insertion depth.

Rubber gaskets for conventional couplings, whether one piece or multiple pieces, are designed with their ID B to be smaller than the pipe OD, as shown in FIG. 2. This is done for reasons of supposed relatively higher sealing capability. If gasket ID B is actually slightly larger than the pipe OD as shown in FIG. 3, the gasket can easily be mounted onto the pipe ends, or the pipe ends inserted easily into the gasket, but previously this was thought to reduce sealing capability.

To provide relatively uniform compression all around the pipe joint and thus optimize gasket sealing capacity, the disclosed coupling desirably has four housing segments as shown in FIG. 4. There are upper and lower housing segments, and two bridges. In preferred embodiments, such as that shown in FIG. 5, the bridges have dihedral angular faces that slidably engage corresponding upper and lower housing segment faces, such that all four segments move inwards towards the center of the coupling as the bolts and nuts are tightened.

In preferred embodiments, pipe coupling housing parts have axially inwardly projecting lands that mate with the end grooves in the pipes to be joined. FIG. 6 illustrates an embodiment of the disclosed coupling in a factory assembled form, with loose bolts and nuts, so that it can be installed directly onto the pipe without breaking it down into its components. After inserting pipe ends from both sides of the coupling, leak-proof installation is completed quickly and simply by fastening the nuts tight.

A pre-assembled pipe coupling for joining and sealing two grooved-ended pipe segments, without disassembling the coupling, is disclosed. This allows for more rapid assembly of pipe systems with more secure and more rigid pipe connections than previously possible. It also makes possible pipe system assembly in awkward, hard to reach locations, and it eliminates any risk of dropping parts during assembly, thus also saving system assembly time, and producing more uniform and consistent assembly results.

Each pre-assembled pipe coupling has a housing that includes upper and lower arcuate housing segments and left and right bridge segments. These bridge segments are disposed between the upper and lower segments. Each bridge segment has at least one set of dihedrally angled faces that engage corresponding faces each in the upper and lower housing segments. A simple embodiment of a bridge segment has two dihedral faces or planes intersecting one another at an angle that is advantageously between 75 and 105 degrees, and preferably about 90 degrees. Each of these two faces, say, for discussion, an upper bridge face and a lower bridge face, has a corresponding face in its respective upper or lower housing segment. Corresponding in this sense means roughly the same shape and area and also disposed at complimentary angles, as will be appreciated by those skilled in the art. Thus, drawing the upper and lower segments inwardly together along a first axis, such as by tightening the bolts of the coupling, creates a force along the intersection of the corresponding segment faces that, because of the angles, presses each bridge segment inward along a second axis roughly tangential to the first axis. It is believed that this four-way compression thus provided exerts a relatively and roughly uniform circumferential force around the coupling that rigidly joins and seals the two pipe segments.

All segments are desirably loosely pre-assembled with bolts and nuts into a coupling and all segments preferably each having radially inwardly projecting lands that mate with the end grooves in the pipes to be joined for more secure coupling.

Inside the pre-assembled housing there is a one-piece circular elastomeric sealing gasket. The gasket advantageously has an inward circumferential and centrally positioned elastomeric pipe stop, and this pipe stop has an inner diameter smaller than an outer diameter of the pipes to be joined, such that when pipe ends are inserted into each opening of the gasket, the pipe ends do not touch each other, but are stopped by and separated by the pipe stop.

The gasket has two circumferential sealing lips axially outward from the pipe stop, and each sealing lip has an inner diameter larger than the outer diameter of the pipe segments to be joined, so that pipe ends can readily and easily be inserted into the gasket with stretching the gasket either before or during insertion of the pipes, and without risk of tearing or dropping the gasket. When speaking of inner diameter for these sealing lips, the inner diameter is measured at the base of the lip, not the inner tip of the lip. The tips of these sealing lips are elastic and flexible and they do make contact with the pipe end, and are readily pushed inward to slide along the pipe as it is inserted, thus forming an excellent seal. The gasket body itself however does not stretch, because the pipe OD is smaller than the inner diameter of the gasket body, the pipe OD being roughly just smaller than the diameter of the gasket as measured at the base of the sealing lip.

The pre-assembled coupling is thus adapted to readily receive a grooved pipe end into each of both open ends of the coupling, with the two pipe ends thereby seated and sealed in the sealing gasket and separated only by the gasket pipe stop. Advantageously, the pipe stop has an inner diameter that is about the same as the inner diameter of the pipes to be joined, since any lesser pipe stop inner diameter will allow some pipe stop to protrude into the flow of whatever is passing through the pipes, while any greater inner diameter provides less and less of a resilient stop for the insertion of the pipes into the gasket and less seal between the pipes.

In some embodiments, each bridge segment has a second set of planar faces that engage second corresponding planar faces each in the upper and lower housing segments. This second set of bridge faces is generally contiguous with the first set of faces. By contiguous we mean each second face has at least one line of intersection with a first face. Advantageously, these second face sets, or at least planar extensions of these second faces, each also meet at their own dihedral angle. When this is the case the angle of the second set of bridge faces is desirably between 75 and 115 degrees and preferably about 100 degrees. However, these second face sets do not have to be dihedrals in their own right, but may be more complex spatially angled planes. It is believed that second sets of bridge faces provide some desirable alignment of bridge segments with upper and lower segments during final tightening of the coupling around the pipe joint.

Some coupling embodiments do not require an inward circumferential and centrally positioned pipe stop in the gasket, and some embodiments do not require lands in the bridge segments.

A method is disclosed for joining and sealing two grooved-ended pipe segments with a pre-assembled pipe coupling, without disassembling the coupling. A grooved pipe end from each pipe segment is inserted into each of both open ends of a pre-assembled pipe coupling that has a one-piece circular sealing gasket with two circumferential sealing lips axially outward from an axial center of the gasket. Each sealing lip has an inner diameter larger than the outer diameter of the pipe segments to be joined. Then roughly uniformly compression force is applied around the circumference of the coupling to rigidly join and seal the pipe segments. The roughly uniform compression force around the circumference of the coupling is advantageously provided by applying a four-way compression force to the coupling, such as by the four-way coupling described above.

BRIEF DESCRIPTION OF THE DRAWINGS

FIG. 1 is a front elevation of a conventional assembled pipe coupling.

DETAILED DESCRIPTION

Figure 1:
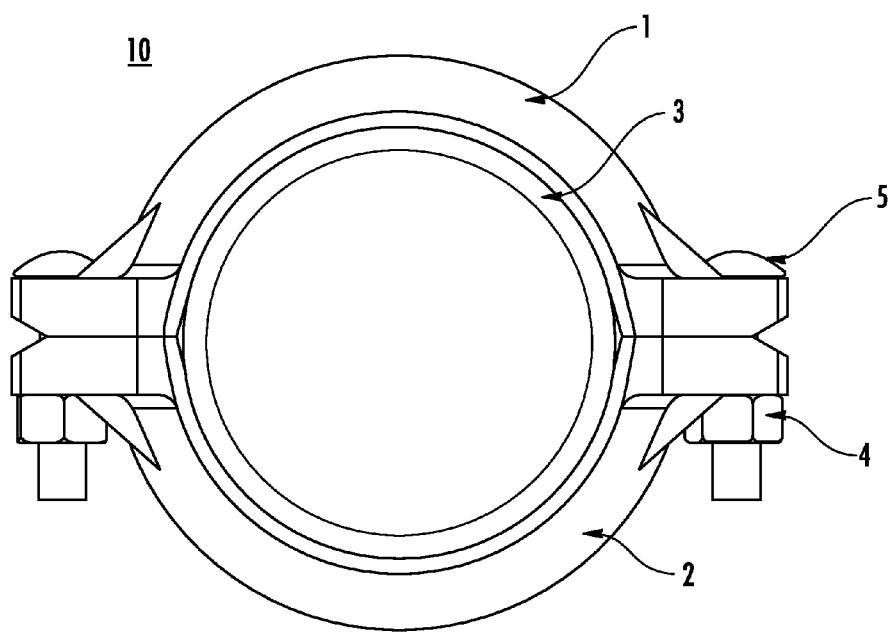
FIG. 1 depicts a one embodiment.

The present embodiments will now be described more fully hereinafter with reference to the accompanying drawings, in which some embodiments are shown. The subject matter of the present disclosure, however, may be embodied in many different forms and should not be construed as limited to the embodiments set forth herein. Rather, these embodiments are provided so that this disclosure will be thorough and complete, and will fully convey the scope of the subject matter to those skilled in the art. In the drawings, like numbers refer to like elements throughout.

Turning now to the drawings, the invention will be described in a preferred embodiment by reference to the numerals of the drawing figures wherein like numbers indicate like parts.

Figure 2:
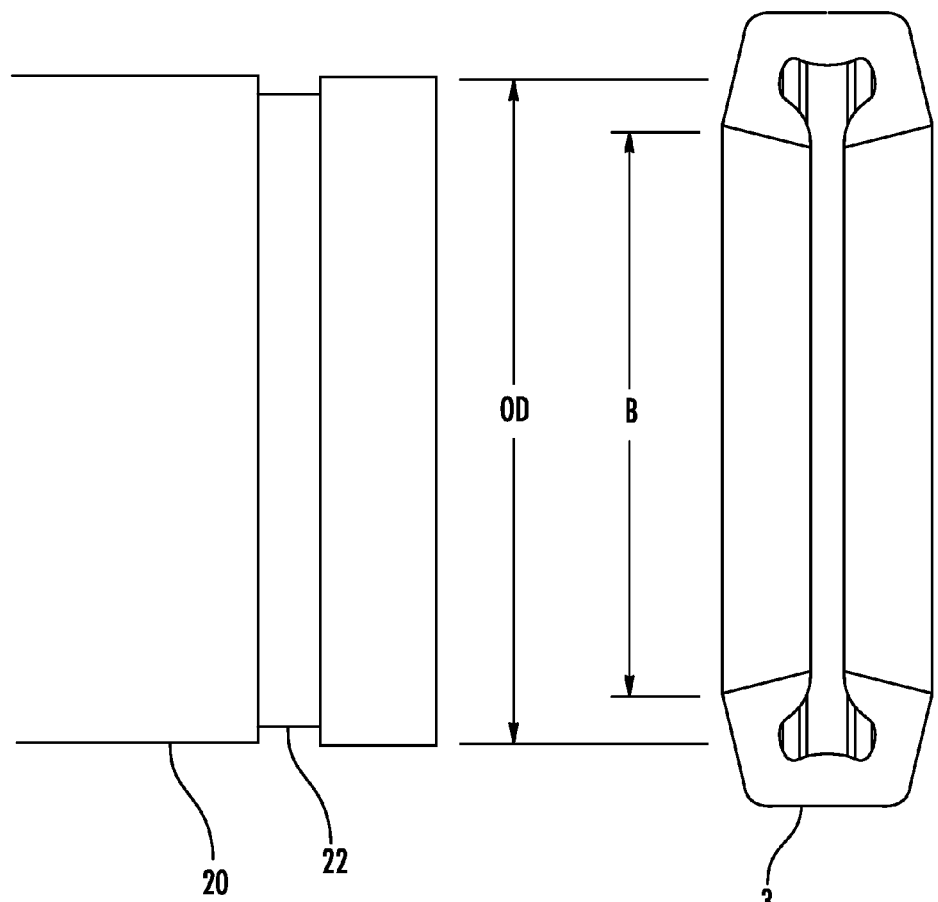
FIG. 2 is a schematic partial section of a conventional pipe gasket.

FIGS. 1 and 2 illustrate typical features of some conventional pipe couplings. Coupling 10 has upper and lower arcuate segments 1 and 2, both enclosing gasket 3, and fastened together by bolts 5 and nuts 4. Pipe 20 fitted with end grooves 22 is shown for comparison of diameters with gasket 3. Conventional pipe gasket 3, especially if provided as a one-piece gasket, has an inner diameter B that is less than the outer diameter OD of pipe 20. This has been reported to optimize sealing of gasket 3 on pipe 20. The problem is that gasket 3 must first be stretched onto the end of pipe 20, with attendant effort and risk of tearing or gouging or dropping gasket 3, and with potential insurmountable difficulty when at least one pipe end is already in a hard to reach location.

Figure 3:
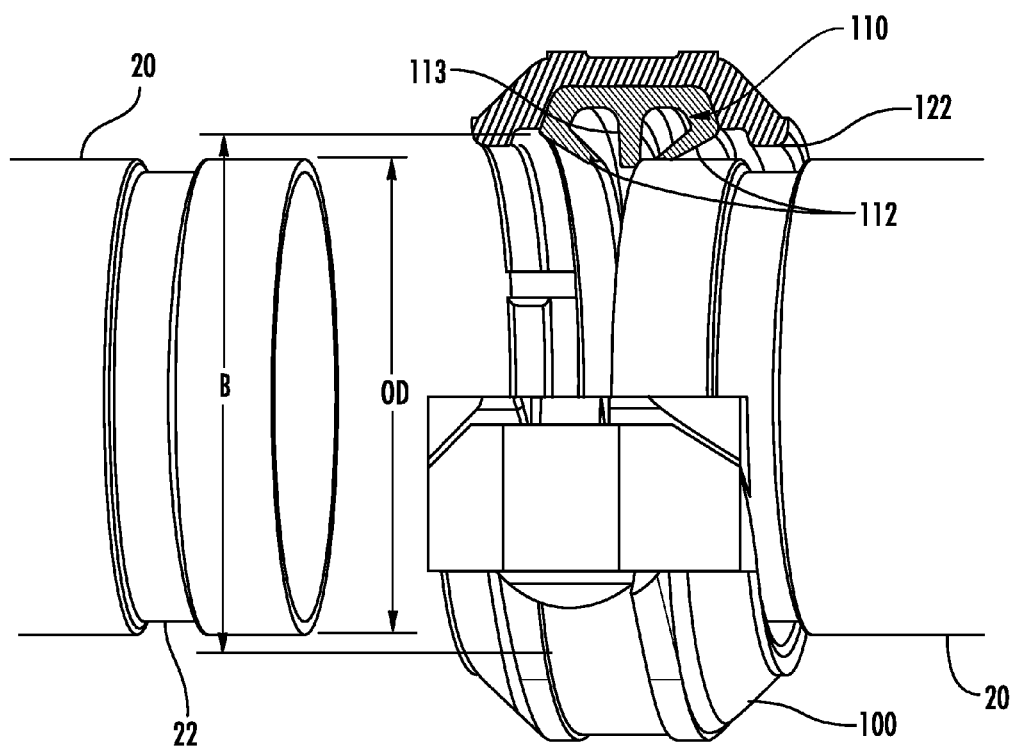
FIG. 3 is a schematic partial section of the disclosed pipe coupling.
Figure 4A:
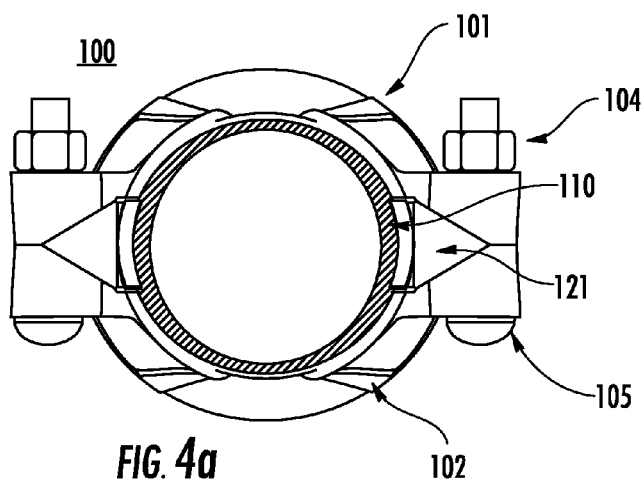
FIGS. 4a-e are front elevations of disclosed assembled pipe couplings.
Figure 4B:
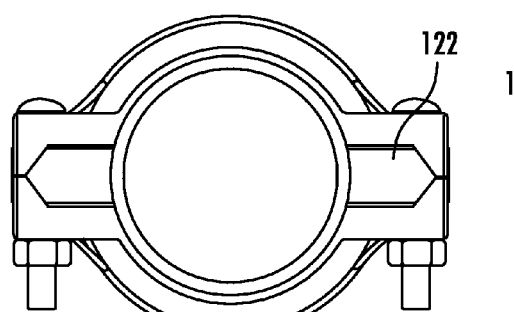
Figure 4C:
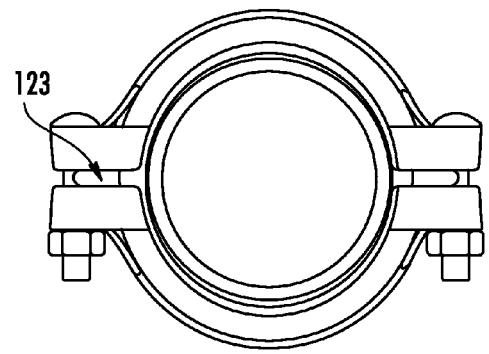
Figure 4D:
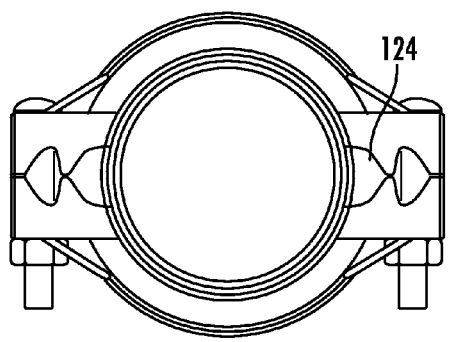
Figure 4E:
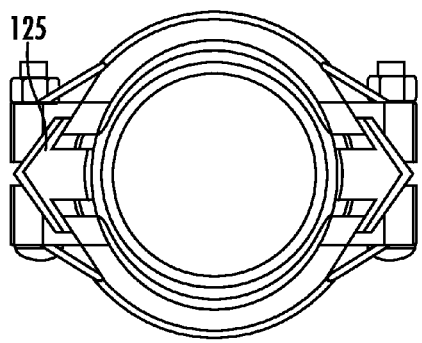

FIG. 3 shows an unconventional comparison of diameters with pipes 20 and gasket 110 inside of pipe coupling 100. Gasket 110 has an inner diameter B (measured at or near the base of sealing lips 112, not at the tips of the lips) that is greater than the outer diameter OD of pipe 20 to optimize quick insertion and quick fit of pipe 20 into gasket 110, without any sacrifice of sealing effectiveness. Abutment of pipes 20 with pipe stop 113 inside gasket 110 is schematically illustrated as well. FIG. 3 schematically illustrates the pipe insertion phase of the process, with coupling lands 122 not yet engaged or mated with pipe end grooves 22. That happens during the coupling tightening phase. (See generally FIGS. 5a-5e.)

FIG. 4 illustrates disclosed variants of a novel pre-assembled pipe coupling. Each alternative embodiment differs principally from the others only in design and placement of the various bridge segments 121-125. In general each coupling 100 has upper housing segment 101, lower housing segment 102, fastened (in FIG. 4a-FIG. 4e is not yet fastened or locked, but rather in pre-assembled state) with bolts 105 and nuts 104. Both bridge segments 121 are shown driven fully inward by the tightening action of the bolts compressing upper and lower segments 101, 102 together, such that all four segments are fully and roughly equally providing circumferential pressure to gasket 110 and to the pipes (not shown in FIG. 4).

FIGS. 5a-5e illustrate, among other details, the four way compressing action provided by the combination of upper and lower housing segments and bridge segments 121 between them. After pipes 20 are inserted into coupling 100 (FIG. 5b), with pipe ends abutting and stopped by pipe stop 113 of gasket 110, and sealing lips 112 flexed inward and sealing against the pipe OD, segment lands 122 are not yet engaged in pipe grooves 22.

Figure 5A:
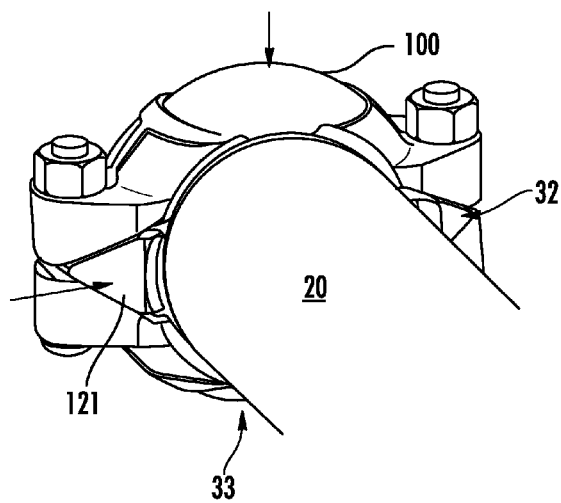
FIGS. 5a-d are schematic perspective and partial sections of disclosed pipe couplings.
Figure 5B:
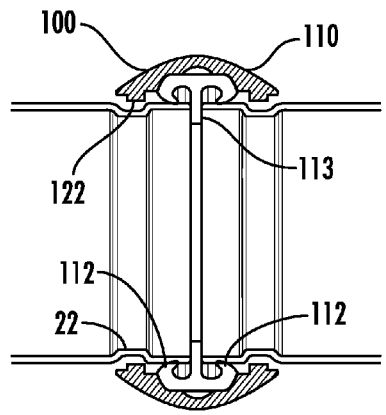

In FIG. 5a, when the bolts are tightened, a compressive force is generated generally along axis 33, which in turn, because of the complementary angular faces 126, 127 of bridge segments with their corresponding upper and lower segment faces (see, e.g., segment face 107 in FIG. 7), drives bridge segments 121 generally inward along axis 32, believed to be at least roughly tangential to axis 33.

Figure 5C:
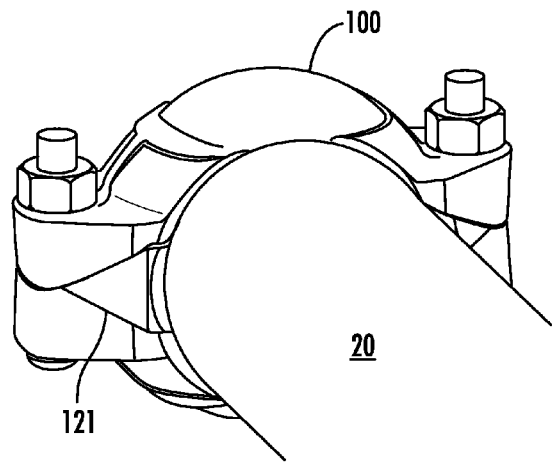
Figure 5D:
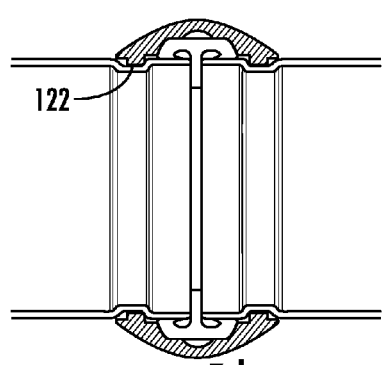

In FIGS. 5c-d, bolts are fully tightened, there is generally no gap now between upper and lower housing segments (as there is in FIG. 5a), and bridge segments 121 are fully driven inward along axis 32 to compress against the gasket and the pipe. Coupling lands 122 are now fully engaged in pipe grooves 22.

Figure 6:
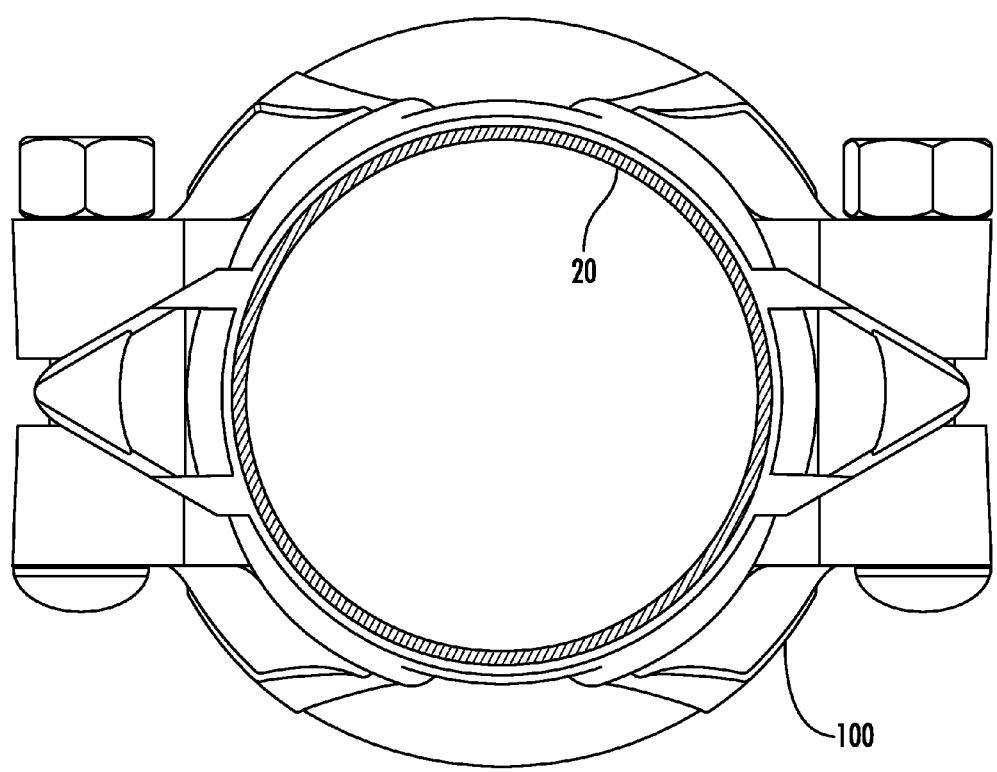
FIG. 6 is a front elevation of a disclosed pre-assembled pipe coupling.
Figure 7:
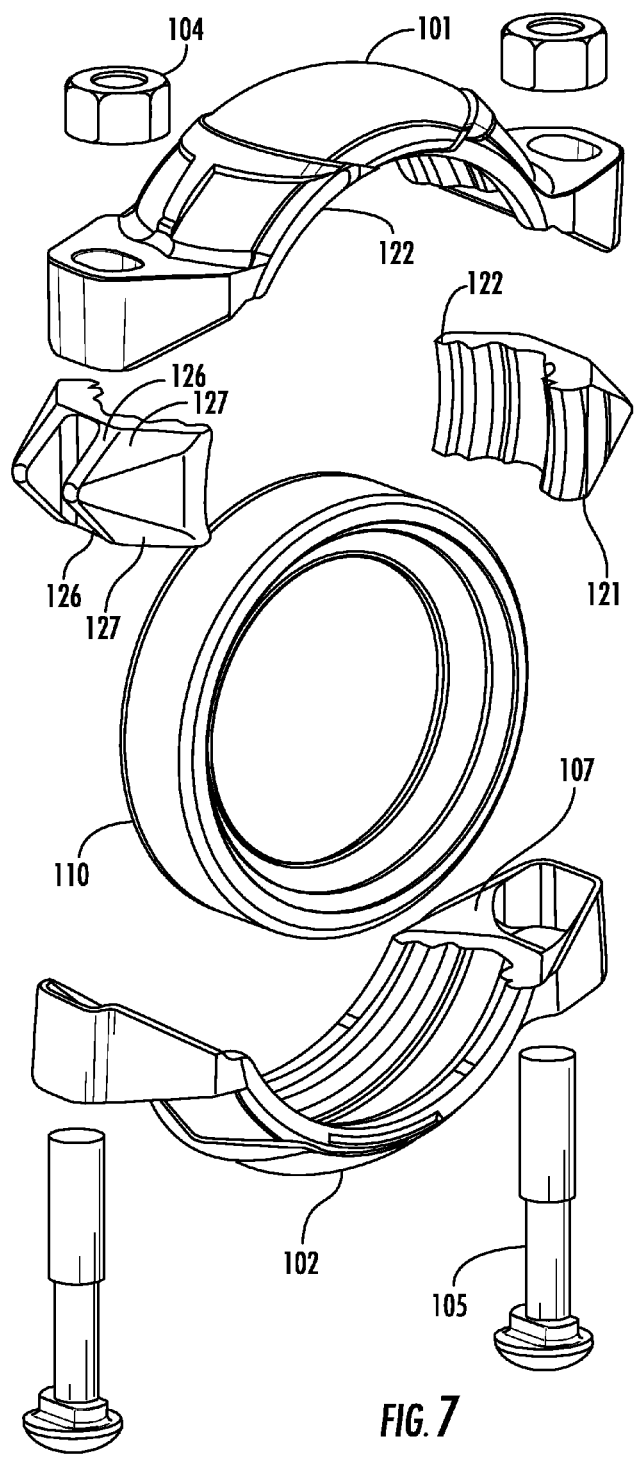
FIG. 7 is an exploded perspective of a disclosed pipe coupling.

FIGS. 6 & 7 show an embodiment of the disclosed pre-assembled coupling in both pre-assembled and exploded perspective views. Schematically, pipe 20 is shown inserted into coupling 100 in FIG. 6. Bolts and nuts are loose and coupling 100 is uncompressed and bridge segments 121 have not yet been driven in.

FIG. 7's exploded view of the uncompressed but pre-assembled coupling 100 affords a more detailed view of aspects of bridge segments 121, as does FIG. 8. In perspective, dihedral faces 126, and second face set 127 can be better seen, as can be corresponding segment face 107 in lower segment 102 set at an angle complementary to the lower face 127 of segment 121. A segment face corresponding to face 126 and set at complementary angle to face 126 is not illustrated, but it is believed those skilled in the art will appreciate already where such a face will lie, given the rest of this disclosure.

Figure 8A:
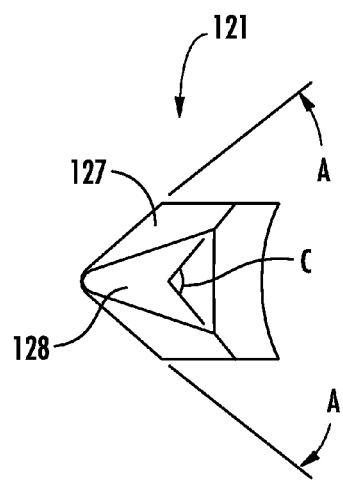
FIGS. 8a-c are side, plan and detail views of disclosed coupling bridge pieces.
Figure 8B:
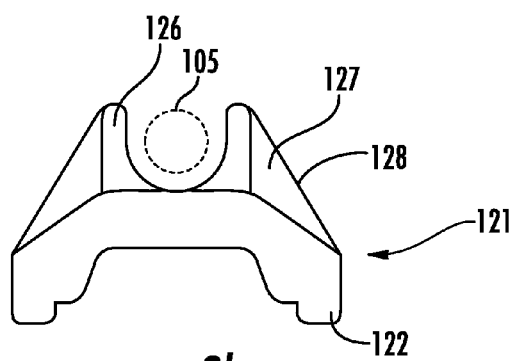
Figure 8C:
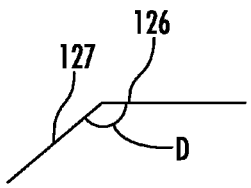

FIGS. 8a-b illustrate details of disclosed coupling bridge segments 121 in side and plan views respectively. Bridge segments 121 operate and function as described in more detail above with reference to upper 101 and lower 102 coupling housing segments, particularly with respect to applying nearly uniform circumferential radially inward pressure to the joined pipe segments 20, or at least 4-way inward pressure to the pipe joint. Each bridge segment 121 desirably has a pair of lands 122 for mating with and applying pressure to corresponding end grooves 22 in pipe segments 20. When present, lands 122 on bridges 121 have a geometry similar to or at least complementary to the geometry of lands 122 on the housing segments 101, 102.

Bridge 121 has at least one dihedral set of faces 126. This face set 126 is comprised of two planar faces disposed to one another at dihedral angle A. In preferred embodiments this angle A is about 90 degrees. It can also be exactly 90 degrees, or can vary with good function from about 75 to 105 degrees. In FIG. 8b the dotted circular phantom line schematically illustrates the position of bolt 105 when bridge 121 is assembled into coupling 100. It can be seen that much of face set 126 can be cut away, such as illustrated by the cut-away for bolt 105 or by faces 128, and still properly function. In preferred embodiments, there are additional face sets 127, which may or may not be dihedral face sets, depending on the relationship between angle A and angle C. For the case A=C, faces 127 are also simple dihedral faces. If angle C does not equal angle A, then faces 127 form a more complex spatial planar angle with each other. Preferred embodiments have values for C that are close to or identical to A. Also, in preferred embodiments, faces 127 are not co-planar with faces 126 (though that is an option in the case A=C) but are instead, with respect to faces 126, swept back from faces 126 at dihedral angle D (detail FIG. 8c).

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are in the tended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below should be construed in view of the full breadth and spirit of the present disclosure as described herein.

What is claimed is:

1. A method for joining and sealing two grooved-ended pipe segments with a pre-assembled pipe coupling without disassembling the coupling, the method comprising:
    inserting a grooved pipe end from each pipe segment into each of both open ends of a pre-assembled pipe coupling having a sealing gasket disposed therein; and
    applying a four-way compression force around the circumference of the pre-assembled pipe coupling to rigidly join and seal the pipe segments by tightening upper and lower arcuate housing segments of the pre-assembled pipe coupling together along a first axis, such tightening causing the upper and lower arcuate housing segments to bear upon first and second sets of dihedrally angled faces of respective left and right bridge segments, wherein the first set of dihedrally angled faces have a line of intersection with the second set of dihedrally angled faces, the dihedrally angled faces engage corresponding faces each in the upper and lower arcuate housing segments and the left and right bridge segments are disposed between the upper and lower arcuate housing segments whereby the left and right bridge segments are forced toward one another along a second axis roughly perpendicular to the first axis;
    wherein all segments are loosely pre-assembled with bolts and nuts into the pre-assembled pipe coupling and all segments have radially inwardly projecting lands that mate with end grooves in the grooved-ended pipe segments.

2. The method of claim 1, further comprising providing the sealing gasket with an inward circumferential and centrally positioned pipe stop having an inner diameter smaller than an outer diameter of the pipes to be joined, and wherein inserting the grooved pipe end from each said pipe segment into each of said open ends of the pre-assembled pipe coupling comprises seating the two pipe ends in the sealing gasket such that the grooved pipe end of the pipe segments are separated only by the pipe stop.

3. The method of claim 2, further comprising providing the pipe stop with an inner diameter that is the same as an inner diameter of the pipes to be joined.

4. The method of claim 1, further comprising providing the first set of dihedrally angled faces with an angle that is between 75 and 105 degrees.

5. The method of claim 4, further comprising providing the first set of dihedrally angled faces with an angle of about 90 degrees.

6. The method of claim 1, further comprising providing the second set of dihedrally angled faces with a dihedral angle with respect to the first set of dihedrally angled faces.

7. The method of claim 1, further comprising providing the second set of dihedrally angled faces with an angle that is the same as the angle of the first set of dihedrally angled faces.

8. The method of claim 1, further comprising providing the second set of dihedrally angled faces with an angle that is between 75 and 115 degrees.

9. The method of claim 8, further comprising providing the second set of dihedrally angled faces with an angle of about 100 degrees.

* * * * *